United States Patent

Anzai et al.

[11] 3,887,861
[45] June 3, 1975

[54] TRANSISTOR INVERTER

[75] Inventors: Hiroshi Anzai; Hiroyuki Miura, both of Tokyo, Japan

[73] Assignee: Kabushikikaisha Tokyo Keiki, Tokyo, Japan

[22] Filed: Feb. 22, 1974

[21] Appl. No.: 444,842

Related U.S. Application Data

[63] Continuation of Ser. No. 289,170, Sept. 14, 1972, abandoned.

[52] U.S. Cl. ............................. 321/18; 321/45 R
[51] Int. Cl. ............................................. H02m 7/52
[58] Field of Search ............... 321/16, 18, 21, 45 R

[56] References Cited
UNITED STATES PATENTS

| | | | |
|---|---|---|---|
| 2,987,664 | 6/1961 | Poirier et al. | 321/18 X |
| 3,257,604 | 6/1966 | Colclaser et al. | 321/45 R |
| 3,310,730 | 3/1967 | Ruch | 321/45 R |
| 3,327,199 | 6/1967 | Gardner et al. | 321/18 X |
| 3,350,620 | 10/1967 | Barron | 321/16 X |
| 3,601,682 | 8/1971 | Iwata et al. | 321/45 R |
| 3,703,677 | 11/1972 | Farrow | 321/45 R |

*Primary Examiner*—A. D. Pellinen
*Attorney, Agent, or Firm*—Marshall & Yeasting

[57] ABSTRACT

A transistor inverter in which a power source is supplied to an output transformer through first and second transistors; the first and second transistors are alternately driven conductive by driving signals of opposite polarities derived from a driving signal generator; and the driving signal generator is driven to be controlled by a driving control signal from a driving control signal generator to provide the above driving signals and controlled by a control signal based on one portion of the output from the output transformer, thereby controlling the level of the driving signal.

3 Claims, 5 Drawing Figures

F I G. 4
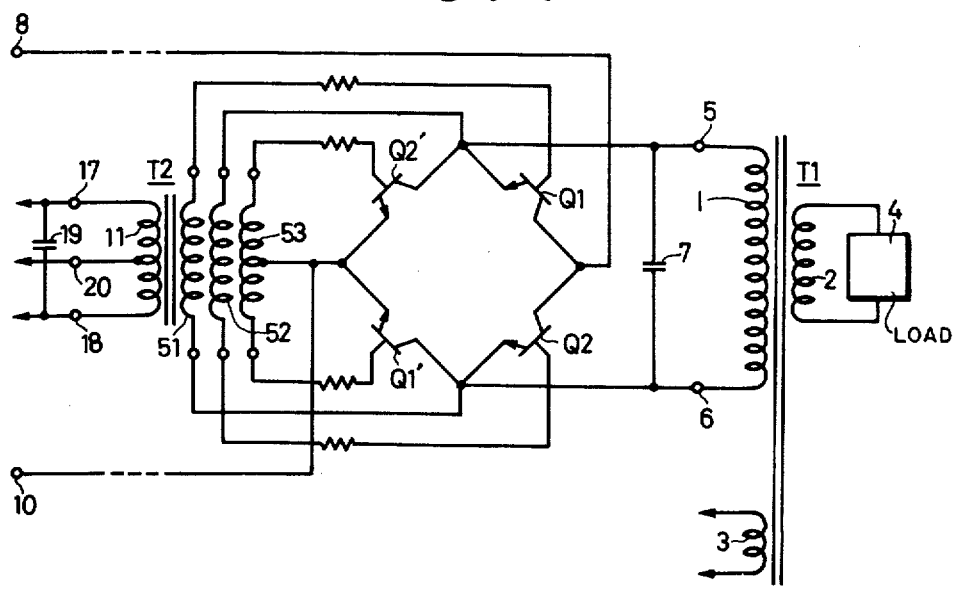
F I G. 5
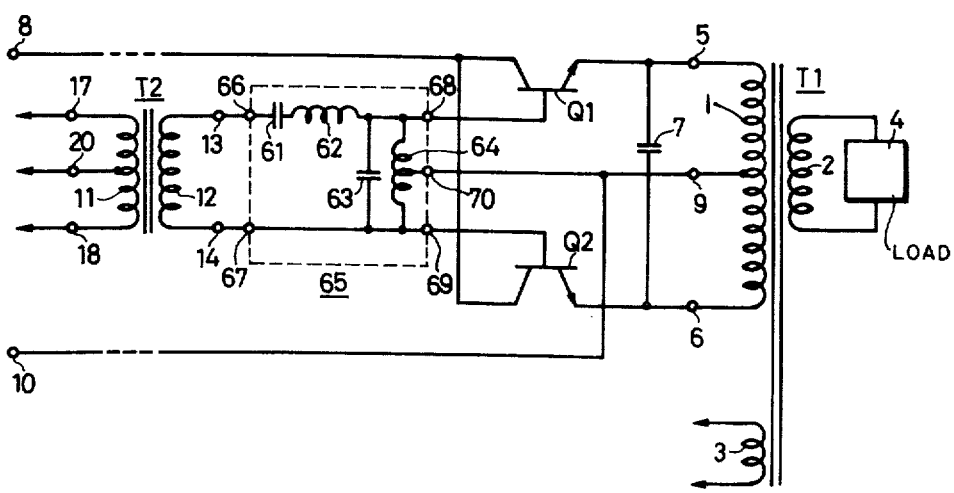

3,887,861

TRANSISTOR INVERTER

This is a continuation of application Ser. No. 289,170 filed Sept. 14, 1972, and now abandoned.

BACKGROUND OF THE INVENTION

1. Field of the Invention

This invention relates to an inverter which is adapted so that a DC power is converted into an AC power and the AC power is supplied to a load, and more particularly to improvements in a transistor inverter in which both ends of the primary side of an output transformer having a load connected to the secondary side are connected to one end of a DC power source through first and second transistors controlled in opposite relation by drive signals of opposite relation.

2. Description of the Prior Art

In conventional transistor inverters of the type mentioned above, only a rectangular AC power can be supplied to the load. Further, in such prior transistor inverters as described above, the voltage of the AC power supplied to the load is dependent upon changes in the load and in the DC power source voltage. Moreover, where a difference exists between the response speeds of the first and second transistors, the DC power source is short-circuited and a stable AC power cannot be supplied to the load.

SUMMARY OF THE INVENTION

One object of this invention is to provide a transistor inverter of the type described above in which even if the waveform of the drive signal for controlling the first and second transistors is rectangular or a desired one, an AC power substantially in line with the waveform can be supplied to the load.

Another object of this invention is to provide a transistor inverter of the aforementioned type in which even if the voltage of the drive signal for controlling the first and second transistors exceeds that of the DC power source, an AC power of a constant voltage can be supplied to the load.

Another object of this invention is to provide a transistor inverter of the aforementioned type in which even if the load and the DC power source voltage change, an AC power of a constant voltage can be supplied to the load.

Still another object of this invention is to provide a transistor inverter of the above-described type in which a stable AC power source can be supplied to the load irrespective of the difference in response speed between the first and second transistors.

Other objects, features and advantages of this invention will become apparent from the following description taken in conjunction with the accompanying drawings.

BRIEF DESCRIPTION OF THE DRAWINGS

FIGS. 3, 4 and 5 are connection diagrams illustrating other examples of this invention.

DESCRIPTION OF THE PREFERRED EMBODIMENTS

Figure 1:
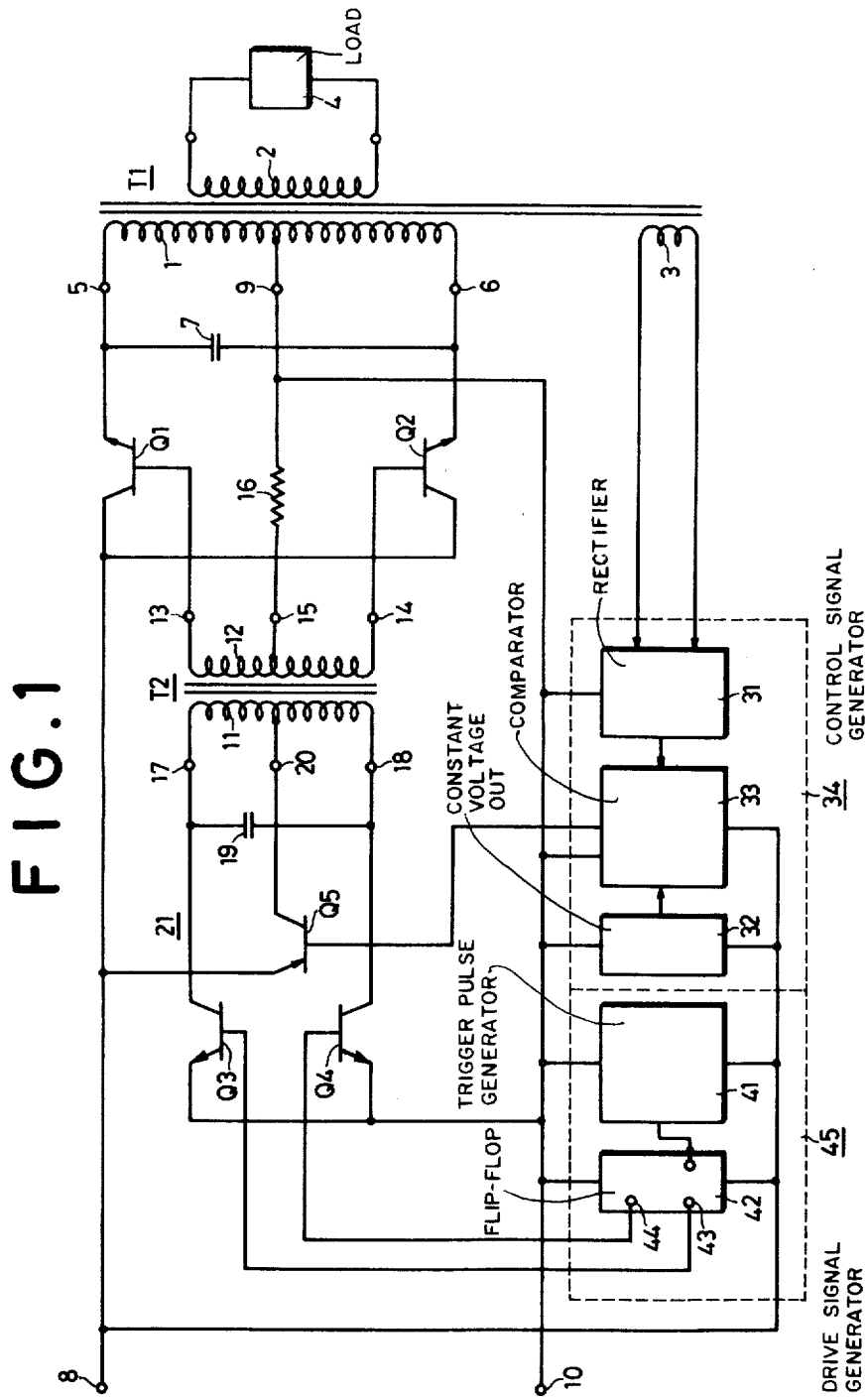
FIG. 1 is a connection diagram showing one example of this invention.

With reference to FIG. 1 one example of this invention will be described. Reference character T1 indicates an output transformer having primary, secondary and tertiary windings 1, 2 and 3. A load 4 is connected between both ends of the secondary winding 2 and a high harmonic suppressing capacitor 7 is connected between both ends 5 and 6 of the primary winding 1.

Reference characters Q1 and Q2 designate, for example NPN-type transistors, whose emitters are connected to the both ends 5 and 6 of the primary winding 1 of the output transformer T1 respectively, whose collectors are interconnected and further connected to a positive DC power source terminal 8 and whose bases are connected to both ends 13 and 14 of a secondary winding 12 of a driving transformer T2 respectively. A neutral terminal 15 of the secondary winding 12 of the driving transformer T2 is connected through a bias resistor 16 to a neutral terminal 9 of the primary winding 1 of the output transformer T1 and a negative power source terminal 10. Further, a waveform adjusting capacitor 19 is connected between both ends 17 and 18 of primary winding 11 of the driving transformer T2.

Reference character Q5 indicates a PNP-type drive current control transistor serving as a variable resistance element, whose emitter and collector are connected to the power source terminal 8 and a neutral terminal 20 of the primary winding 11 of the driving transformer T2 respectively and whose base is supplied with a DC control signal derived from a comparator 33 of a control signal generator 34 described later, Q3 and Q4 are NPN-type switching transistors whose emitters are connected to the power source terminal 10, whose collectors are connected to the both ends 17 and 18 of the primary winding 11 of the driving transformer T2 respectively and whose bases are respectively supplied with YES and NO output terminals 43 and 44 of a flip-flop circuit 42 of a drive control signal generator 45 described later. These transistors Q3, Q4 and Q5 and the driving transformer T2 constitute a drive signal generator 21.

Reference numeral 34 identifies the aforementioned control signal generator, which consists of a rectifier 31 rectifying an output from the tertiary winding 3 of the aforesaid output transformer T1, a constant-voltage circuit 32 formed including, for example, a Zener diode and adapted to produce a constant voltage based on a power source voltage derived between the power source terminals 8 and 10, and a comparator 33 adapted to be actuated by the power source voltage between the power source terminals 8 and 10 for comparing the rectified output derived from the rectifier 31 with the constant voltage from the constant voltage circuit 32. The control signal generator 34 is designed so that the output of the comparator 33 is supplied to the base of the transistor Q5 of the aforementioned drive signal generator 21.

Reference numeral 45 designates the aforesaid drive control signal generator, which consists of a trigger pulse generator 41 operated by the power source voltage between the power source terminals 8 and 10 to generate a trigger pulse and the aforementioned flip-flop circuit 42 similarly operated by the power source voltage between the power source terminals 8 and 10 and actuated by the trigger pulse from the trigger pulse generator 41 and which is adapted so that outputs derived from YES and NO output terminals 43 and 44 of the flip-flop circuit 42 are supplied to the bases of the transistors Q3 and Q4 of the aforementioned drive signal generator 21.

The foregoing has described the construction of one example of this invention. With such a construction, trigger pulses are sequentially supplied from the trigger pulse generator 41 of the drive control signal generator 45 to the flip-flop circuit 42, by which a signal having a predetermined negative voltage and representing 1 in binary indication, that is, a rectangular drive control signal of a negative logic 1 is derived from the YES and NO output terminals 43 and 44 of the flip-flop circuit 42 alternately, thus turning on the transistors Q3 and Q4 of the drive signal generator circuit 21 alternately. Turning on the transistor Q3, there is formed a loop of the power source terminal 8—the emitter and collector of the transistor Q5—the winding between the terminals 20 and 17 of the primary winding 11 of the driving transformer T2 —the collector and emitter of the transistor Q3—the power source terminal 10. While, turning on the transistor Q4, there is formed a loop of the power source terminal 8—the emitter and collector of the transistor Q5—the winding between the terminals 20 and 18 of the primary winding 11 of the driving transformer T2—the collector and emitter of the transistor Q4—the power source terminal 10. Accordingly, a rectangular drive signal A such as shown in FIG. 2A is derived in the secondary winding 12 of the driving transformer T2.

Figure 2:
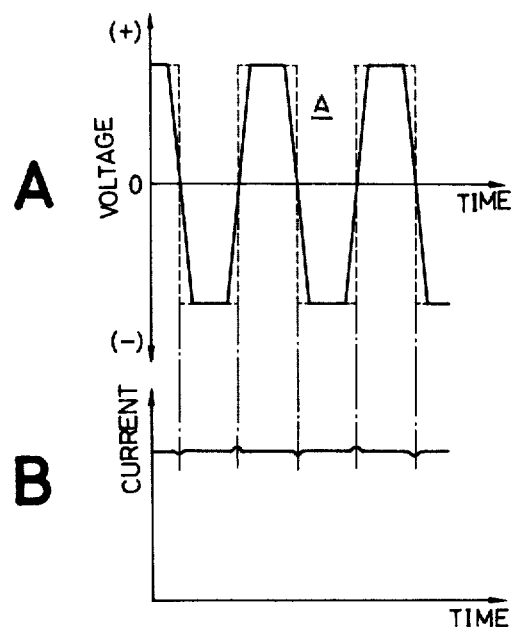
FIG. 2 is a waveform diagram for explaining the example of FIG. 1.

Such a rectangular drive signal A as shown in FIG. 2A, which is derived in the secondary winding 12 of the driving transformer T2 as described above, is applied to the bases of the transistors Q1 and Q2, so that in the positive period of the drive signal A the transistor Q1 is controlled in its conducting direction to form a loop of the power source terminal 8—the collector and emitter of the transistor Q1—the winding of the output transformer T1 between the terminals 5 and 9 thereof —the power source terminal 10. In the negative period of the drive signal A, the transistor Q2 is controlled in its conducting direction to form a loop of the power source terminal 8—the collector and emitter of the transistor Q2—the winding of the output transformer T1 between the terminals 6 and 9 thereof —the power source terminal 10. As a result of this, the secondary winding 2 of the output transformer T1 and consequently the load 4 is supplied with a rectangular output synchronized with the drive signal A, thus providing the function of an inverter.

With an arrangement described above, the drive signal A is derived from the driving transformer T2 based on the drive control signal from the drive control signal generator 45, by which the rectangular output is derived from the output transformer T1. In this case, the both ends 5 and 6 of the primary winding 1 of the output transformer T1 are connected to the emitters of the transistors Q1 and Q2 respectively, the neutral terminal 9 is connected to the power source terminal 10 and the collectors of the transistors Q1 and Q2 are connected to the power source terminal 8, so that the load is connected to the emitter circuits of the transistors Q1 and Q2. Accordingly, the output of the output transformer T1 is obtained from the transistors Q1 and Q2 in the emitter-follower manner Therefore, if the magnitude of the drive signal A is in such a region that the transistors Q1 and Q2 are not saturated, the output from the output transformer is obtained substantially in line with the waveform and voltage of the drive signal A and if the voltage of the drive signal A exceeds that between the power source terminals 8 and 10, the transistors Q1 and Q2 are saturated and the magnitude of the output of the output transformer T1 is limited. Further, where the load 4 is smaller than a predetermined value or the voltage between the power source terminals 8 and 10 exceeds a predetermined value by some cause, the output derived from the output transformer T1 increases and this is represented in the output of the tertiary winding 3 of the output transformer T1. Consequently, the output of the comparator 33 of the control signal generator 34 increases in a positive direction, which leads to an increase in the resistance value between the collector and emitter of the transistor Q5 to cause a decrease in the drive signal A and in the output of the output transformer T1. The output of the output transformer T1 is thus held substantially at a predetermined value. Further, according to the above-described construction, the waveform adjusting capacitor 19 is provided and is charged and discharged alternately in reverse directions by alternate conduction of the transistors Q3 and Q4, so that the waveform of the drive signal A has inclined rise and fall characteristics as indicated by solid lines in FIG. 2A. This eliminates the possibility that the transistors Q1 and Q2 are simultaneously controlled in their conducting direction based on the drive signal A, so that the current flowing from the terminal 8 to the transistors Q1 and Q2 does not ripple at instants of rise and fall of the drive signal A as shown in FIG. 2B and even if it ripples, it is negligibly small. Accordingly, a stable output can be derived from the output transformer T1. By the way, if the drive signal A is not inclined at its rise and fall as indicated by broken lines, the transistor Q2 (or Q1) is likely to be controlled in its conducting direction (due to the difference in the response speed) immediately before the transistor Q1 (or Q2) is controlled in its conducting direction and consequently the current flowing from the terminal 8 to the transistors Q1 and Q2 greatly ripples in the period in which the both transistors Q1 and Q2 are controlled in their conducting direction, with the result that the output derived from the output transformer T1 becomes unstable.

Figure 3:
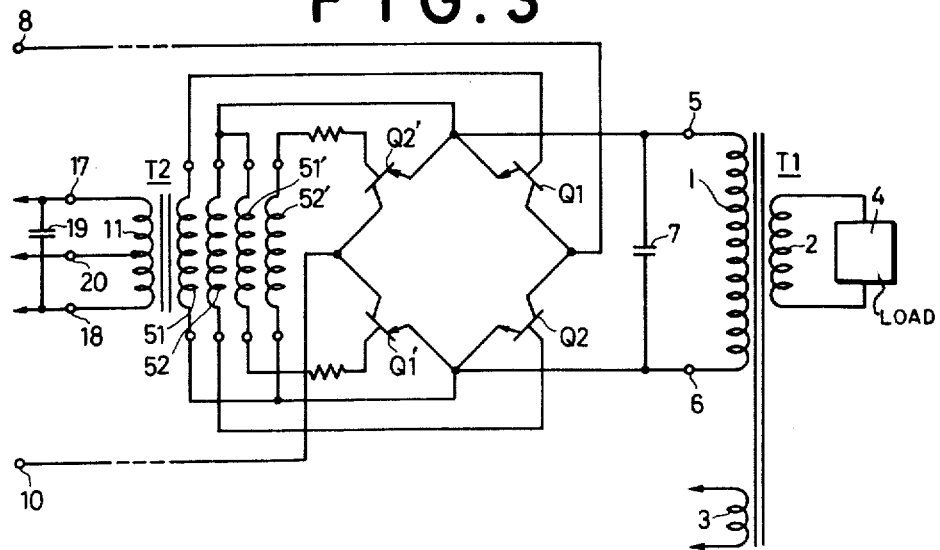

Referring now to FIG. 3, another example of this invention will be described. This example is identical in construction with the FIG. 1 example except that the driving transformer T2 and the elements following it are constructed as will be described hereinbelow. In the present example, elements corresponding to those in the example of FIG. 1 are identified by the same reference numerals and characters. As illustrated in FIG. 3, the driving transformer T2 has four secondary windings 51, 51', 52 and 52' in place of the secondary winding 12 and PNP-type transistors Q1' and Q2' are provided in addition to those Q1 and Q2. The collectors of the transistors Q1 and Q2 are connected together to the power source terminal 8, the collectors of the transistors Q1' and Q2' are connected together to the power source terminal 10, the emitters of the transistors Q1 and Q2' are connected together to the one end 5 of the primary winding 1 of the output transformer T1 and for example, positive ends of the secondary windings 52 and 51' of the driving transformer T2, the emitters of the transistors Q2 and Q1' are connected together to the other end 6 of the primary winding 1 of the output transformer T1 and negative ends of the secondary windings 51 and 52' of the driving transformer T2, the bases of the transistors Q1 and Q2' are connected to positive terminals of the secondary windings 51 and 52' of the driving transformer T2 respectively and the bases of the transistors Q2 and Q1' are connected to negative terminals of the secondary winding 52 and 51' respectively.

With such an arrangement as depicted in FIG. 3, as described above, when the drive signal A is derived in the driving transformer T2, in its positive period the transistors Q1 and Q' are controlled in their conducting direction to provide a loop of the power source terminal 8—the collector and emitter of the transistor Q1—the primary winding 1 of the output transformer T1—the emitter and collector of the transistor Q1'—the power source terminal 10 and in the negative period of the drive signal A the transistors Q2 and Q2' are controlled in their conducting direction to form a loop of the power source terminal 8—the collector and emitter of the transistor Q2—the primary winding 1 of the output transformer T1—the emitter and collector of the transistor Q2'—the power source terminal 10. Consequently, an output similar to that described above in connection with FIG. 1 is obtained in the output transformer T1 and is supplied to the load 4.

Also in the present example, the output transformer T1 is connected to the emitters of the transistors Q1, Q2 and Q1', Q2', the transistor Q5 (not shown in this example) is controlled and the waveform adjusting capacitor 19 is provided, so that exactly the same results as those described above in connection with FIG. 1 can be obtained.

Turning now to FIG. 4, another example of this invention will be described, which is a modified form of the example of FIG. 3. In this example, the transistors Q1' and Q2+ are NPN-type and the windings 51' and 52' of the driving transformer T2 are replaced with one winding 53. The emitter of the transistor Q1 and the collector of the transistor Q2' are connected together to the terminal 5 of the primary winding 1 of the output transformer T1 and the positive end of the secondary winding 52 of the driving transformer T2. The emitter of the transistor Q2 and the collector of the transistor Q1' are connected together to the terminal 6 of the primary winding 1 of the output transformer T1 and the negative end of the secondary winding 51 of the driving transformer T2. The bases of the transistors Q1 and Q2 are connected to the positive end of the winding 51 and the negative end of the winding 52 respectively and those of the transistors Q1' and Q2' are connected to positive and negative ends of the winding 53 respectively and the neutral point of the winding 53 is connected to the emitters of the transistors Q1' and Q2' and the power source terminal 10.

With such a construction of the FIG. 4 example, as is the case with the FIG. 1 example, when the drive signal A is obtained in the driving transformer T2, the transistors Q1', Q1' and Q2, Q2' are alternately controlled in their conducting direction to provide in the output transformer T1 an output similar to that obtained in the example of FIG. 1, which is supplied to the load 4.

Also in the present example, the output transformer T1 is connected to the emitters of the transistors Q1 and Q2 and the transistor Q5 is controlled, so that the same results as those obtainable in the example of FIG. 1 can be obtained.

Referring now to FIG. 5, another example of this invention will hereinbelow be described, which is a modified form of the example of FIG. 1. In the present example, the waveform adjusting capacitor 19 in the example of FIG. 1 is left out but, instead, a filter circuit 65 is provided which consists of, for example, a series circuit of a capacitor 61 and an inductor 62 and a parallel circuit consisting of a capacitor 63 and an inductor 64. A pair of input terminals 66 and 67 of the filter circuit 65 are connected to the ends 13, 14 of the secondary winding 12 of the driving transformer T2 respectively, a pair of output terminals 68 and 69 are connected to the bases of the transistors Q1 and Q2 respectively and a neutral terminal 70 of the inductor 64 is connected to the neutral terminal 9 of the primary winding 1 of the output transformer T1 and the power source terminal 10 respectively.

With the arrangement depicted in FIG. 5, the rectangular drive signal A is rendered by the filter circuit 65 into a sinusoidal drive signal and the transistors Q1 and Q2 are controlled by the sinusoidal drive signal. This promotes the effect that the rise and fall of the drive signal are inclined by the provision of the waveform adjusting capacitor described above in connection with FIG. 1 and, at the same time, even if an input signal is a rectangular wave, a sinusoidal output can be obtained, and accordingly a sinusoidal inverter can be obtained economically. Namely, a sinusoidal wave can be obtained by the provision of a filter circuit at the output side of the transformer T1 but, in such a case, the filter circuit becomes bulky because power capacity must be taken into account and the circuit construction is not economical but this invention is free from such a defect.

The foregoing examples should be construed as being merely illustrative of this invention and it is possible to effect various modifications and variations such as alterations of the conductivity type of the transistors, the polarity of the transformers and the polarity of the voltages derived at the power source terminals, substitution of the control transistor Q5 with any other desired control element and so on.

We claim as our invention:

1. A transistor inverter comprising:
a DC power source;
an output transformer having primary, secondary and tertiary windings;
a load connected to the secondary winding of the output transformer;
a first transistor having its collector connected to one end of the DC power source and its emitter connected to one end of the primary winding of the output transformer;
a second transistor having its collector connected to the one end of the DC power source and its emitter connected to the other end of the primary winding of the output transformer;
a third transistor having its collector connected to the other end of the DC power source and its emitter connected to the other end of the primary winding of the output transformer;
a fourth transistor having its collector connected to the other end of the DC power source and its emitter connected to the one end of the primary winding of the output transformer;
a drive control signal generator generating rectangular drive control signals of opposite polarities;
a control signal generator having a rectifier for rectifying an output derived from the tertiary winding of the output transformer, a constant voltage circuit for generating a constant voltage and a comparator for generating a control signal by comparing an output derived from the rectifier with the constant voltage derived from the constant voltage circuit;

a driving signal generator having a driving transformer with primary, secondary, tertiary, quarternary and quinary windings, a fifth transistor having its collector connected to the one end of the primary winding of the driving transformer and its emitter connected to the other end of the DC power source, a sixth transistor having its collector connected to the other end of the primary winding of the driving transformer and its emitter connected to the other end of the DC power source, a seventh transistor having its collector connected to the neutral point of the primary winding of the driving transformer and its emitter connected to the one end of the DC power source and a waveform adjusting capacitor connected between both ends of the primary winding of the driving transformer, the one and other ends of the secondary winding of the driving transformer being connected to the base of the first transistor and the emitters of the second and third transistors, respectively, the one and other ends of the tertiary winding of the driving transformer being connected to the emitters of the first and fourth transistors and the base of the second transistor, respectively, the one and other ends of the quarternary winding of the driving transformer being connected to the emitters of the first and fourth transistors and the base of the third transistor, respectively, and the one and other ends of the quinary winding of the driving transformer being connected to the base of the fourth transistor and the emitters of the second and third transistors, respectively;

means for supplying the rectangular drive control signals derived from the drive control signal generator to the bases of the fifth and sixth transistors of the driving signal generator, respectively; and means for supplying the control signal derived from the comparator of the control signal generator to the base of the seventh transistor of the driving signal generator.

2. A transistor inverter comprising:

a DC power source;

an output transformer having primary, secondary and tertiary windings;

a load connected to the secondary winding of the output transformer;

a first transistor having its collector connected to one end of the DC power source and its emitter connected to one end of the primary winding of the output transformer;

a second transistor having its collector connected to the one end of the DC power source and its emitter connected to the other end of the primary winding of the output transformer;

a third transistor having its emitter connected to the other end of the DC power cource and its collector connected to the other end of the primary winding of the output transformer;

a fourth transistor having its emitter connected to the other end of the DC power source and its collector connected to the one end of the primary winding of the output transformer;

a drive control signal generator generating rectangular drive control signals of opposite polarities;

a control signal generator having a rectifier for rectifying an output derived from the tertiary winding of the output transformer, a constant voltage circuit for generating a constant voltage and a comparator for generating a control signal by comparing an output derived from the rectifier with the constant voltage derived from the constant voltage circuit;

a driving signal generator having a driving transformer with primary, secondary, tertiary and guarternary windings, a fifth transistor having its collector connected to the one end of the primary winding of the driving transformer and its emitter connected to the other end of the DC power source, a sixth transistor having its collector connected to the other end of the primary winding of the driving transformer and its emitter connected to the other end of the DC power source, a seventh transistor having its collector connected to the neutral point of the primary winding of the driving transformer and its emitter connected to the one end of the DC power source and a waveform adjusting capacitor connected between both ends of the primary winding of the driving transformer, the one end of the secondary winding of the driving transformer being connected to the base of the first transistor, the other end of the secondary winding of the driving transformer being connected to the emitter of the second transistor and the collector of the third transistor, the one end of the tertiary winding of the driving transformer being connected to the emitter of the first transistor and the collector of the fourth transistor, the other end of the tertiary winding of the driving transformer being connected to the base of the second transistor, the both ends of the quarternary winding of the driving transformer being connected to the bases of the third and fourth transistors, and the neutral point of the quarternary winding of the driving transformer being connected to the other end of the DC power source and the emitters of the third and fourth transistors;

means for supplying the rectangular drive control signals derived from the drive control signal generator to the bases of the fifth and sixth transistors of the driving signal generator, respectively; and means for supplying the control signal derived from the comparator of the control signal generator to the base of the seventh transistor of the driving signal generator.

3. A transistor inverter comprising:

a DC power source;

an output transformer having primary, secondary and tertiary windings;

a load connected to the secondary winding of the output transformer, the neutral point of the primary winding of the output transformer being connected to one end of the DC power source;

a first transistor having its collector connected to the other end of the DC power source and its emitter connected to one end of the primary winding of the output transformer;

a second transistor having its collector connected to the other end of the DC power source and its emitter connected to the other end of the primary winding of the output transformer;

a drive control signal generator generating rectangular drive control signals of opposite polarities;

a control signal generator having a rectifier for rectifying an output derived from the tertiary winding of the output transformer, a constant voltage circuit for generating a constant voltage and a comparator for generating a control signal by comparing an output derived from the rectifier with the constant voltage derived from the constant voltage circuit;

a driving signal generator having a driving transformer with primary and secondary windings, a third transistor having its collector connected to the one end of the primary winding of the driving transformer and its emitter connected to the one end of the DC power source, a fourth transistor having its collector connected to the other end of the primary winding of the driving transformer and its emitter connected to the one end of the DC power source, a fifth transistor having its collector connected to the neutral point of the primary winding of the driving transformer and its emitter connected to the other end of the DC power source and a filter circuit having a series circuit of a first capacitor and a first inductor and a parallel circuit of a second capacitor and a second inductor, the one end of the series circuit being connected to the one end of the secondary winding of the driving transformer, the other end of the series circuit and the one end of the parallel circuit being connected to the base of the first transistor, the other end of the parallel circuit being connected to the other end of the secondary winding of the driving transformer and the base of the second transistor, and the neutral point of the second inductor of the parallel circuit being connected to the one end of the DC power source, and a waveform adjusting capacitor connected between both ends of the primary winding of the driving transformer, means for supplying the rectangular drive control signals derived from the drive control signal generator to the bases of the third and fourth transistors of the driving signal generator, respectively; and means for supplying the control signal derived from the comparator of the control signal generator to the base of the fifth transistor of the driving signal generator.

* * * * *